(12) United States Patent
Pochert

(10) Patent No.: US 9,527,970 B2
(45) Date of Patent: Dec. 27, 2016

(54) POLYMER-MODIFIED BITUMEN COMPOUND FOR A BITUMINOUS COVERING LAYER OF A ROOF SHEET, A BITUMINOUS ROOF SHEET AND A FULLY RECYCLABLE ROOF SHEET

(75) Inventor: Jan-Niels Pochert, Berlin (DE)

(73) Assignee: W. Quandt GmbH & Co. KG Dachbahnen- und Dachstoff-Fabrik, Berlin (DE)

( * ) Notice: Subject to any disclaimer, the term of this patent is extended or adjusted under 35 U.S.C. 154(b) by 1117 days.

(21) Appl. No.: 13/473,569

(22) Filed: May 16, 2012

(65) Prior Publication Data

US 2013/0123396 A1    May 16, 2013

(30) Foreign Application Priority Data

Nov. 16, 2011 (DE) .......... 10 2011 086 514
Dec. 22, 2011 (DE) .......... 10 2011 089 507
Dec. 22, 2011 (DE) .......... 10 2011 089 510

(51) Int. Cl.
| | | |
|---|---|---|
| *C08J 5/04* | (2006.01) | |
| *E04D 5/10* | (2006.01) | |
| *C08L 95/00* | (2006.01) | |
| *C08L 91/08* | (2006.01) | |
| *C08L 53/02* | (2006.01) | |
| *C08L 23/06* | (2006.01) | |

(52) U.S. Cl.
CPC .......... *C08J 5/043* (2013.01); *C08J 5/046* (2013.01); *E04D 5/10* (2013.01); *C08J 2395/00* (2013.01); *C08L 23/06* (2013.01); *C08L 53/02* (2013.01); *C08L 91/08* (2013.01); *C08L 95/00* (2013.01); *C08L 2555/34* (2013.01); *C08L 2555/86* (2013.01)

(58) Field of Classification Search
CPC ......... C08J 5/043; C08J 5/046; C08J 2395/00; E04D 5/10; C08L 95/00; C08L 91/08; C08L 2555/34; C08L 2555/86; C08L 53/02; C08L 23/06
USPC .......................................................... 524/59
See application file for complete search history.

(56) References Cited

U.S. PATENT DOCUMENTS

| | | | |
|---|---|---|---|
| 2004/0224176 A1 | 11/2004 | Hindi et al. | |
| 2008/0115444 A1* | 5/2008 | Kalkanoglu | B32B 37/24 52/518 |
| 2009/0000514 A1 | 1/2009 | Trumbore et al. | |
| 2009/0000515 A1* | 1/2009 | Trumbore | C08L 91/06 106/270 |
| 2011/0196073 A1* | 8/2011 | Fee | C08L 95/00 524/68 |
| 2011/0197785 A1* | 8/2011 | Trumbore | C08L 95/00 106/270 |

FOREIGN PATENT DOCUMENTS

| | | |
|---|---|---|
| GB | 1 417 571 | 2/1972 |
| JP | 102 87 812 | 10/1998 |
| JP | 2005155316 | 6/2005 |

\* cited by examiner

*Primary Examiner* — Angela C Scott
(74) *Attorney, Agent, or Firm* — Bachman & LaPointe, PC

(57) ABSTRACT

A polymer-modified bitumen (PMB) compound for a bituminous covering layer of a roof sheet, predominantly including a distillation bitumen, in particular one which may contain a synthetic rubber filler in the form of SBS (styrene-butadiene-styrene) in an amount which modifies the properties of the distillation bitumen, wherein an additive which further modifies the bitumen is present in the form of a polymer, wherein the SBS-modified bitumen further modified by the additive has properties in respect of a softening point and penetration, wherein the polymer is polyethylene present in an amount ranging from 2.5 wt.-% to 7.5 wt.-%, the softening point is in a range between 70° C. and 170° C., and the penetration value is between 99 and 30 ¹⁄₁₀ mm.

23 Claims, 2 Drawing Sheets

POLYMER-MODIFIED BITUMEN COMPOUND FOR A BITUMINOUS COVERING LAYER OF A ROOF SHEET, A BITUMINOUS ROOF SHEET AND A FULLY RECYCLABLE ROOF SHEET

BACKGROUND OF THE INVENTION

The present invention relates to a polymer-modified bitumen compound for a bituminous covering layer of a roof sheet. The invention further relates to use of polyethylene as a modifying additive in an SBS-modified bitumen compound. The invention also relates to a method of producing a bituminous covering layer of a roof sheet from a polymer-modified bitumen compound. The invention further relates to a roof sheet having a bituminous covering layer and a bitumen reinforcement and to a method of producing and recycling such a roof sheet.

Such roof sheets are known from the prior art and are used in particular to cover and seal flat roofs. Depending on building requirements, the bituminous covering layer is provided, for example, as a conventional bitumen layer (oxidized bitumen layer) or as a polymer-modified bitumen layer, and the bitumen reinforcement as a polyester fleece, fiberglass mat, fiberglass fabric or felt core.

After reaching the end of their service life, the roof sheets are usually processed for energy recovery, i.e., they are burned as a substitute fuel in coal-fired power stations. This kind of recycling causes considerable $CO_2$ emissions and does not constitute full (material) recycling of the roof sheets in the real sense.

Varieties of distillation bitumen and oxidized bitumen are basically and primarily used nowadays to provide a bituminous covering layer in such roof sheets. Bitumen as such is obtained by distilling crude oil. It consists of a mixture of different hydrocarbons and on account of its properties is one of the most-used sealants in the construction industry. Distillation bitumen, or refined bitumen, usually refers to residual oil that remains after fractional distillation at reduced pressure and a temperature of approximately 350° C. These soft to medium-hard bitumen varieties are primarily used in road construction. Distillation bitumen may also refer to a "high-vacuum bitumen", which is obtained by further processing or further distillation of distillation bitumen under a vacuum. High-vacuum bitumens, i.e., a special form of distillation bitumen, are mostly used for mastic asphalt, floor screeds and rubber goods, due to their hardness, and can also be used as distillation bitumens for a bituminous covering layer of a roof sheet. In contrast, oxidized or blown bitumens are obtained by blowing air into distillation bitumen air at a temperature of approximately 250° C. Depending on the specific process used, it is possible to give the bitumen improved properties in respect of resistance to heat or cold. This type of bitumen is mostly used for roof sheets, sealing sheets and adhesives. However, it has been found that oxidized bitumens have certain disadvantages with regard to hot processing and/or recyclability, which may be detrimental to their use. Examples of such disadvantages include health hazards or the like, so it may be advantageous in certain cases to use distillation bitumen instead of oxidized bitumen.

Polymer-modified bitumen compounds, so called, are obtained by chemical mixing of distillation bitumen and polymers, and are proven in practice. Their thermal and expansion properties can be varied very well. Polymer-modified bitumens are used for high-quality roof and sealing sheets and for traffic areas that are subjected to heavy loads and stress, such as airports. Parameters which are routinely used to classify different grades of bitumen include depth of penetration and softening point. Breaking point and ductility are basically suitable as well. Other values of potential interest for processing or industrial production include flash point, paraffin content and ash content.

The penetration value is usually specified on the basis of needle penetration pursuant to OENORM EN 426; a particular penetration depth is obtained that specifies the bitumen hardness in $\frac{1}{10}$ mm. Since bitumen does not have a melting point, it is necessary to define a softening point by subjecting it to continuous heating. The ring-and-ball method determines a certain temperature at which a specific degree of plastic deformation is reached. This temperature is referred to as the softening point according to OENORM EN 427. A breaking point may be determined in accordance with OENORM EN 12593, for example. Ductility is determined by stretching a test object in an apparatus. The length in centimeters that the test item can be stretched before it breaks is referred to as its stretchability or ductility.

Whereas oxidized bitumen is relatively advantageous in certain respects compared to distillation bitumen, distillation bitumens may nevertheless have a substantial advantage over oxidized bitumens due to their better compatibility in production, use, processing and in their long-term use as roof sheets. This may relate to behavior under heating, for example, which may result in outgassing or the like. It would also be desirable, in the case of distillation bitumens and in particular in the case of polymer-modified bitumen compounds, to provide characteristics that are similar or equivalent to those of oxidized bitumens.

SUMMARY OF THE INVENTION

This aspect is addressed by the invention, the object of which is to specify a polymer-modified bitumen compound for a bituminous covering layer of a roof sheet, which predominantly comprises a distillation bitumen that has been further modified with regard to the properties of the distillation bitumen. One modification, more specifically, is intended to produce properties that are largely similar or equivalent to those of an oxidized bitumen. This relates in particular to an SBS-modified distillation bitumen which contains a synthetic rubber filler in the form of SBS (styrene-butadiene-styrene) to an amount which modifies the properties of the distillation bitumen. Another object of the invention, more particularly, is to improve the SBS-modified bitumen compound modified by the additive in respect of its softening point and penetration value, in particular to make the latter similar or equivalent to the softening point and penetration value of an oxidized bitumen.

More specifically, a roof sheet of the kind initially specified should be totally recyclable. It is desirable, in particular, to provide a roof sheet of the kind initially specified that keeps $CO_2$ emissions low when subjected to energy recovery.

This object is achieved by the invention with a polymer-modified bitumen compound of the kind initially specified, in which the features disclosed herein are also provided, in accordance with the invention. The invention is based on the realization that its objects can substantially be achieved with a polymer-modified bitumen compound based in particular on an SBS-modified distillation bitumen, in which polyethylene is present in an amount of 2.5 wt.-% to 7.5 wt.-%. The polyethylene is added in the form of polyethylene wax, in particular as an oxidized homopolymeric polyethylene. The invention is also based on the realization that these values advantageously result in properties similar or equivalent to those of oxidized bitumen, yet providing improved compatibility with regard to production, application and long-term use as roof sheets. The polyethylene wax can preferably be present in an amount ranging from 3.0 wt.-% to 5.0 wt.-%.

One particularly preferred embodiment is one based on the realization that a softening point in the range between 70 to 170° C. and a penetration value in the range between 99 and 30 ¹⁄₁₀ mm can be achieved.

More specifically, the B70/100 and B160/220 grades of distillation bitumen have proved as initial bitumen materials to be advantageous in implementing the concept (Bxxx/yyy specifies the range of penetration depth from xxx ¹⁄₁₀ mm to yyy ¹⁄₁₀ mm).

For B70/100 distillation bitumen, one particularly preferred embodiment can have polyethylene present in an amount ranging from 2.5 wt.-% to 5.0 wt.-% with a resulting softening point being between 70° C. and 80° C., preferably between 72° C. and 73° C., and with a resulting penetration value between 30 and 40 ¹⁄₁₀ mm, preferably between 31 and 37¹⁄₁₀ mm.

For B160/220 distillation bitumen, one particularly preferred embodiment can have polyethylene present in an amount ranging from 3.0 wt.-% to 7.0 wt.-% with a resulting softening point being between 76° C. and 170° C., preferably between 77° C. and 145° C., and with a resulting penetration value between 110 and 60 ¹⁄₁₀ mm, preferably between 101 and 66¹⁄₁₀ mm.

The bitumen compound may preferably include the polyethylene as an oxidized homopolymeric polyethylene, and the oxidized homopolymeric polyethylene can have a dropping point (ASTM D-3954) between 85° C. and 115° C. and a viscosity between 180 and 405 (at 140° C., measured according to the Brookfield viscosity standard).

During preparation of a bituminous covering layer of a roof sheet as described above, the polyethylene can be added at temperatures between 120° C. and 180° C.

In one aspect of the invention, the ethylene can be oxidized homopolymeric polyethylene which acts as a lubricant. Further, the can be added in a paddle mixer.

The roof sheet according to one aspect of the invention can include the distillation bitumen formed with linearly structured and radially structured SBS in a ratio of more than 1:4, and in another aspect of the invention, the distillation bitumen is formed only with linearly structured SBS content.

The concept of the invention also leads to use of polyethylene as a modifying additive as disclosed herein.

The concept of the invention also leads to a method for producing a bituminous covering layer of a roof sheet made of a polymer-modified bitumen compound as disclosed herein.

Advantageous developments of the invention are detailed herein, including specific advantageous ways of realizing the concept explained above with regard to achieving the objects of the invention and with regard to other advantages.

In one preferred development, the object of the invention is achieved by a roof sheet which comprises a bituminous covering layer made of an aforementioned polymer-modified bitumen compound, with a softening temperature and having a bitumen reinforcement with a melting point, wherein the melting point of the bitumen reinforcement is greater than the softening temperature of the bituminous covering layer and lower than 230° C.

The preferred development of the invention is based on the idea that full recycling of roof sheets comprising at least one bituminous covering layer and a bitumen reinforcement according to the prior art has not been possible hitherto because the melting point of the bitumen reinforcement is higher than 230° C. For example, a bitumen reinforcement in the form of polyester fleece has a melting point of approximately 260° C.

Since a bituminous covering layer of a roof sheet can have flash point of approximately 230° C. in extreme cases, this means that melting down the entire roof sheet at approximately 260° C.—this temperature would then be stipulated for melting polyester fleece enclosed by the roof sheet—would involve said flash point being exceeded. This would lead to the bituminous covering layer outgassing or carbonizing. Such a roof sheet would thus be unsuitable for recycling.

The preferred development is based on the realization that outgassing or carbonizing of the bituminous covering layer when melting the roof sheet can be prevented by using a bitumen reinforcement having a melting point lower than 230° C. In order to achieve optimal recovery of the bitumen, the melting point of the bitumen reinforcement is greater than the softening temperature of the bituminous covering layer. In the context of the present invention, the softening temperature of the bitumen or the bituminous covering layer is understood to be the softening point as measured by the ring-and-ball method (DIN EN 1427). The invention is based on the idea that full recyclability of a bituminous covering layer requires that the melting point of the bitumen reinforcement be defined in relation to a defined softening point of the bituminous covering layer, since a bituminous covering layer has a melting range, but not a defined melting point. More particularly, the melting point of the bitumen reinforcement is greater than an upper limit to the melting range of the bituminous covering layer.

In one preferred embodiment, the bitumen reinforcement consists of a material having a melting point in the range between 130° C. and 200° C., in particular between 150° C. and 190° C., in order to reduce the melting energy needed to recycle the roof sheet.

In order to achieve optimal separation of the bitumen reinforcement from the covering layer, the bitumen reinforcement may consist of an organic polymer having a melt flow rate in a range between 10 and 100 g/10 min at 230° C. and under a weight of 2.16 kg (melt flow rate MFR according to DIN ISO 1133).

In one particularly preferred embodiment, the bitumen reinforcement is made of polypropylene. It has been shown that using polypropylene as bitumen reinforcement makes a recyclable roof sheet according to the invention possible, yet also has a positive effect on the resilience of the roof sheet during its service life. The bitumen reinforcement may consist of isotactic polypropylene having a melting point of 176° C.

In order to simplify recycling of the roof sheet, the bitumen reinforcement may consist exclusively of polypropylene.

This means that only two mono-materials are left after recycling, namely bitumen and polypropylene.

It has proved to be particularly advantageous to reduce the viscosity of a polymer bitumen surfacing compound accordingly by means of a polypropylene reinforcement to obtain a fully recyclable roof sheet. It is preferable if the softening point of a bitumen surfacing compound may rise, yet the viscosity thereof—measured at a constant temperature—may fall, and particular that the viscosity decreases in relation to that of a conventional polymer/elastomer compound.

In the course of further development work, it was found that, although adding a synthetic rubber such as SBS (styrene-butadiene-styrene) has positive effects for production on the elasticity, heat resistance and cold bending properties of a bitumen compound, in particular of a distillation bitumen surfacing compound, its softening point is raised. For example, addition of—normal—11.5% SBS to a distillation bitumen may raise the softening temperature from a range between 40 and 60° C. to approximately 128° C.; this can result in an increase in the production temperature and/or recycling temperature that is disadvantageous for the purposes of production and full recyclability.

It is particularly preferred when the surfacing compound softening temperatures of such polymer-modified bitumen sheets or other elastomer-bitumen surfacing compounds are further reduced, in particular by adding polyethylene waxes. More specifically, a polyethylene-based component may amount to 3 to 4%.

A particularly preferred embodiment is one in which polyethylene waxes are added to distillation bitumen grades such as B70/100 or B160/220, and in which the SBS content is preferably kept less than normal, preferably between 7% and 13.5%, in particular below 11.5%. This means that the softening point of such a surfacing compound rises—albeit less than normal—, yet the viscosity thereof, measured at a constant temperature, falls in relation to that of a conventional polymer/elastomer compound.

Elastomer/bitumen surfacing compounds may preferably be mixed with linearly structured SBS, without and/or instead of radially structured SBS and distillation bitumen (preferably B160/220). This is preferably done with approximately 25% of the total amount of elastomer, which can first be added to the B160/220-grade bitumen during the mixing process. Under a constant temperature, it is possible in such cases also to reduce the viscosity in comparison with compounds to which 100% radially structured SBS has been added.

By adding rapeseed oils or other flux oils to an elastomer/bitumen compound, it is possible to reduce the viscosity at a given temperature.

Producing a polymer/bitumen surfacing compound containing no mineral fillers is preferred, if a recyclable roof sheet is the aim, because no infusible residues ensue. In this case also, the viscosity is lower for a given constant temperature than when the compound contains mineral filler materials.

Polymer/bitumen compounds, preferably containing soft plastomers—in particular APP (atactic polypropylene)—, should preferably be produced in such a way that they result in low-viscosity polymer/bitumen compounds on account of their molecular weight.

In one particularly preferred development of the invention, the bituminous covering layer has a softening temperature ($T_E$) between 40° C. and 150° C., in particular between 40° C. and 130° C. In this way, environmentally harmful outgassing during the recycling processed can be reduced. If the softening temperature of the bituminous covering layer is between 40° C. and 130° C., with simultaneous reduction of the melting point of the bitumen reinforcement to 135° C., for example, this allows recycling to be optimized in terms of energy consumption, and if the softening temperature of the bituminous covering layer is between 40° C. and 130° C., and the melting point of the bitumen reinforcement is kept, for example, around 176° C., this allows the covering layer and bitumen reinforcement materials to be separated in an optimized manner, in particular so that each type of material is fully separated.

The invention also relates to a method for producing and a method for full recycling of a roof sheet. A method for producing a fully recyclable roof sheet comprises the steps of:

providing a bitumen reinforcement having a melting point, applying a bituminous covering layer having a softening temperature onto the bitumen reinforcement, wherein the melting point of the bitumen reinforcement is greater than the softening temperature of the bituminous covering layer and lower than 230° C., wherein the provision and application are carried out at a production temperature which is lower than the melting point of the bitumen reinforcement and greater than the softening temperature of the bituminous covering layer.

The method for producing a fully recyclable roof sheet can be supplemented with advantageous developments corresponding to the developments described above with regard to the inventive roof sheet, and to the advantages thereof.

A method for recycling a fully recyclable roof sheet comprises the steps of:

supplying a roof sheet comprising a bituminous covering layer having a softening temperature and a bitumen reinforcement having a melting point, wherein the melting point of the bitumen reinforcement is greater than the softening temperature of the bituminous covering layer and less than 230° C., melting the roof sheet at a recycling temperature, wherein the recycling temperature is less than 230° C.

The method for full recycling of a roof sheet can be supplemented with advantageous developments corresponding to the developments described above with regard to the inventive roof sheet, and to the advantages thereof.

In the method for full recycling of a roof sheet, the step of melting the roof sheet is carried out at a recycling temperature which is greater than the melting point of the bitumen reinforcement. This allows the recycling process to be controlled in a particularly simple manner. In order to facilitate recycling in fully separated fractions, the step of melting the roof sheet may also be carried out at a recycling temperature which is lower than the melting point of the bitumen reinforcement.

BRIEF DESCRIPTION OF THE DRAWINGS

Embodiments of the invention shall now be described with reference to the drawings and in comparison with the prior art, which is partly shown as well. These drawings are not necessarily meant to show the embodiments according to scale; rather, the drawings are provided in schematic and/or slightly distorted form wherever this aids explanation. Reference is made to the relevant prior art for further details about technical principles that are not immediately evident from the drawings. Account should be taken of the fact that many modifications and changes may be made to the shape and details of a variant, without deviating from the general idea of the invention. The features of the invention disclosed in the description, in the drawings and in the claims may be essential, both separately and in any combination, for development of the invention. In addition, all combinations of at least two of the features disclosed in the description, the drawings and/or the claims fall within the scope of the invention. The general idea of the invention is not limited to the exact shape or detail of the preferred variants shown and described in the following, nor is it limited to one subject-matter that would be limited in comparison to the subject-matter in the claims. When measurement ranges are specified, values within the specified limits are also disclosed as threshold values and may be applied and claimed at will. Additional advantages, features and details of the invention derive from the following description of preferred embodiments.

More specifically.

DETAILED DESCRIPTION

Figure 1:
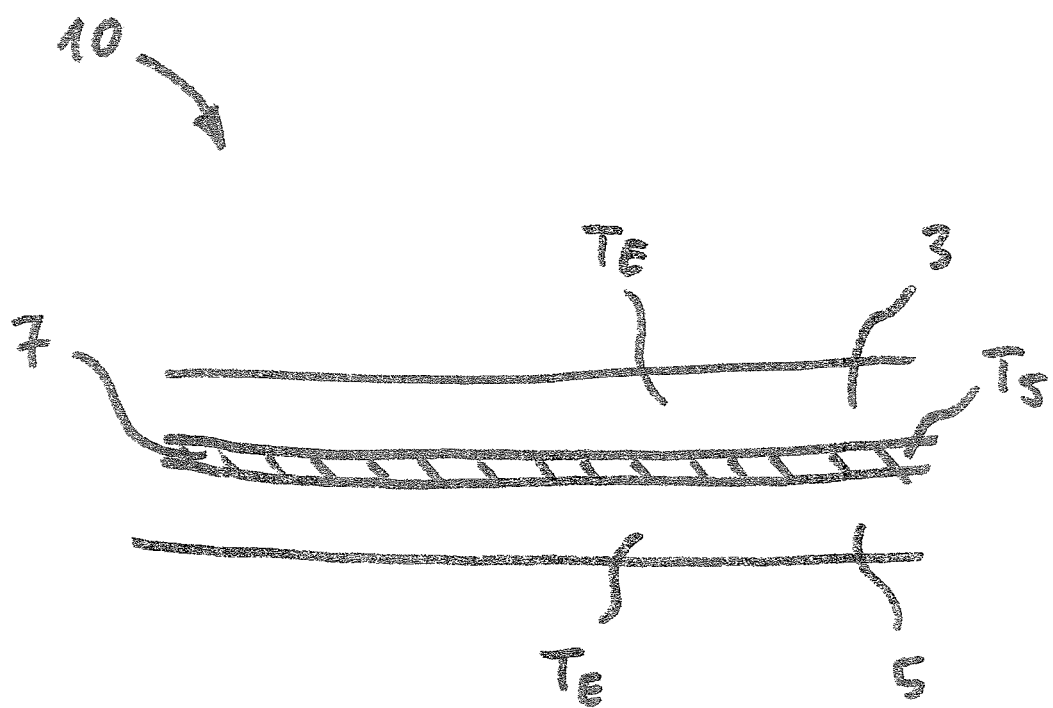
FIG. 1 shows a preferred embodiment of a roof sheet.

A roof sheet 10 in FIG. 1 has a bitumen reinforcement 7 in the form of a polypropylene layer. A bituminous covering layer, formed from an upper layer 3 and a bottom layer 5, is applied to the bitumen reinforcement 7. Upper layer 3 and bottom layer 5 consist of a polymer-modified bitumen compound. Bitumen reinforcement 7 has a melting point $T_S$, and upper layer 3 and bottom layer 5 have a softening temperature $T_E$. The melting point $T_S$ of bitumen reinforcement 7 is greater than the softening temperature $T_E$ of upper layer 3 and bottom layer 5, and lower than 230° C.

Figure 2:
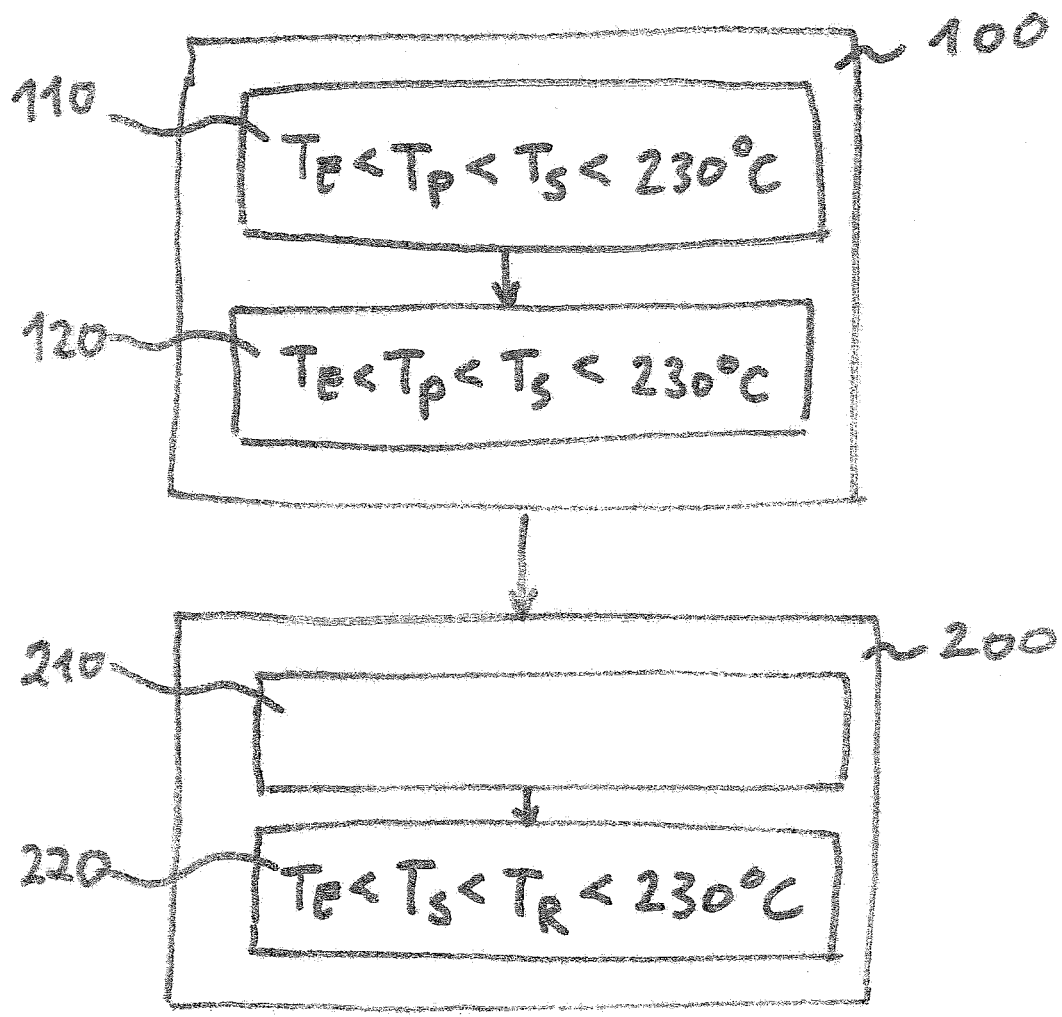
FIG. 2 shows a scheme illustrating the interaction between production and full recycling of the roof sheet in FIG. 1.

FIG. 2 shows interaction between production 100 and full recycling 200 of the inventive roof sheet. In the production process 100, a bitumen reinforcement with a melting point $T_S$ is provided in a first step. In a second step, application 120 of a bituminous covering layer with a softening temperature $T_E$ to the bitumen reinforcement is carried out. The melting point $T_S$ of the bitumen reinforcement is greater than the softening temperature $T_E$ of the bituminous covering layer and lower than 230° C. The provision 110 and application 120 are carried out at a production temperature $T_P$ which is lower than the melting point $T_S$ of the bitumen reinforcement and greater than the softening temperature $T_E$ of the bituminous covering layer.

During full recycling 200, the supplying 210 of the roof sheet produced during production 100 is carried out in a first step. In a second step, the roof sheet is melted 220 at a recycling temperature $T_R$. The recycling temperature $T_R$ is less than 230° C. and greater than the melting point $T_S$ of the bitumen reinforcement. Accordingly, both the bituminous covering layer and the bitumen reinforcement are completely melted in the melting step 220.

Preferred examples for producing a polymer-modified bitumen compound for a bituminous covering layer of a roof sheet, based on a distillation bitumen, shall now be described. The present examples relate in particular to a starting material in the form of distillation bitumen containing no SBS, but they apply also to an SBS-modified distillation bitumen as the starting material. All tests have shown, both for distillation bitumen with no SBS content and also for distillation bitumen containing SBS, that polyethylene wax can be used to provide distillation bitumen with properties that are similar to those of an oxidized bitumen. More particularly, the use of polyethylene wax in an SBS-modified distillation bitumen has proved to be advantageous for reducing the SBS content to below a normal content, in particular to less than 11.5%, in particular to less than 9.5%. This is advantageous in that a relatively low viscosity for processing, in particular for production and recycling, can thus be achieved without having to increase the softening temperature beyond a threshold temperature that is disadvantageous for recycling, for example. The latter would be the case if one were reliant on SBS modification alone. It is advantageous, to that extent, to use polymer-modified bitumen compound based on a distillation bitumen having no SBS content. The use of polymer-modified bitumen compound based on a distillation bitumen that includes SBS content is also and likewise advantageous and can be applied to adjust the softening point and penetration properties, as well as other properties of the bitumen compound, in an advantageous manner.

EXAMPLE 1

Distillation Bitumen as Starting Material: B160/220 (No SBS Content)

Softening point measured by the ring-and-ball method: 41.0° C.

TABLE 1

Test results:

| PE wax content HON 7686 | softening point | Penetration |
|---|---|---|
| 3.00% | 77.0°C. | 100 |
| 3.85% | 85.0°C. | 76 |
| 5.00% | 113.5°C. | 86 |
| 5.30% | 93.5°C. | 75 |
| 7.00% | >140.0°C. | 67 |

Conclusion

The results show that relatively small percentual increases in the amount of polyethylene wax result in substantial increases in the softening points, in some cases far beyond the softening points of oxidized bitumen.

The penetration value (softness) of bitumen falls significantly when polyethylene wax is added, although penetration is somewhat greater than in the case of commonly processed varieties of oxidized bitumen (e.g. B85/40).

The results can also be achieved, in principle, for an SBS-modified distillation bitumen as starting material, in particular with an SBS content less than 11.5%, in particular with an SBS content between 7 and 11.5%, in particular with an SBS content of 9.5%.

EXAMPLE 2

Test with B70/100 Distillation Bitumen as Starting Material

The following values were obtained when 3.85% polyethylene wax HON 8062 was added:

TABLE 2

| Softening point measured by the ring-and-ball method: | 72.8°C. |
|---|---|
| Penetration: | 34¹/₁₀ mm |

Conclusion:

In this case, the softening point and penetration values of a standard B85/25 oxidized bitumen can be expected with a slight additional percentage increase in the amount of added wax.

The results can also be achieved, in principle, for an SBS-modified distillation bitumen as starting material, in particular with an SBS content less than 11.5%, in particular with an SBS content between 7 and 11.5%, in particular with an SBS content of 9.5%.

One or more embodiments of the present invention have been described. Nevertheless, it will be understood that various modifications may be made without departing from the spirit and scope of the invention. Accordingly, other embodiments are within the scope of the following claims.

The invention claimed is:

1. A polymer-modified bitumen (PMB) compound for a bituminous covering layer of a roof sheet, comprising a distillation bitumen, wherein an additive which is in the form of a polymer and which modifies properties of the distillation bitumen is present, and wherein the bitumen compound modified by the additive has properties in respect of a softening point and penetration, wherein the additive comprises polyethylene present as a polyethylene wax, wherein
the polyethylene wax is in an amount ranging from 2.5 wt.-% to 5.0 wt.-%;
a softening point of the bitumen compound is between 70° C. and 80° C.; and
a penetration value of the bitumen compound is between 30 and 40 $^1/_{10}$ mm.

2. The bitumen compound according to claim 1, wherein the polyethylene wax is present in an amount ranging from 3.0 wt.-% to 5.0 wt.-%.

3. The bitumen compound according to claim 1, wherein the bitumen compound contains a synthetic rubber filler in the form of styrene-butadiene-styrene.

4. The bitumen compound according to claim 1, wherein the bitumen compound modified by the additive in the form of a polymer has properties including an increased softening point relative to that of the distillation bitumen and a lower penetration value relative to the distillation bitumen.

5. The bitumen compound according to claim 1, wherein the distillation bitumen is a styrene-butadiene-styrene-modified distillation bitumen and wherein the styrene-butadiene-styrene-modified distillation bitumen modified by the polyethylene has properties including an increased softening point relative to that of the styrene-butadiene-styrene-modified distillation bitumen and a lower penetration value relative to the styrene-butadiene-styrene-modified distillation bitumen.

6. The bitumen compound according to claim 1, wherein the distillation bitumen is a B70/100 distillation bitumen, and wherein
the softening point of the bitumen compound is between 72° C. and 73° C.; and
the penetration value of the bitumen compound is between 31 and 37 $^1/_{10}$ mm.

7. The bitumen compound according to claim 1, wherein the polyethylene wax is an oxidized homopolymeric polyethylene.

8. The bitumen compound according to claim 7, wherein the oxidized homopolymeric polyethylene has a dropping point between 85° C. and 115° C. and a viscosity at 140° C., measured according to the Brookfield viscosity standard between 180 and 405.

9. A roof sheet (10) comprising a bituminous covering layer (3, 5), comprising a polymer-modified bitumen compound comprising a distillation bitumen, wherein an additive which is in the form of a polymer and which modifies properties of the distillation bitumen is present, and wherein the bitumen compound modified by the additive has properties in respect of a softening point and penetration, wherein the additive comprises polyethylene present as a polyethylene wax in an amount ranging from 2.5 wt.-% to 7.5 wt.-% and having a softening temperature ($T_E$), and a bitumen reinforcement (7) having a melting point ($T_S$), wherein the melting point ($T_S$) of the bitumen reinforcement (7) is greater than the softening temperature ($T_E$) of the bituminous covering layer (3, 5) and less than 230° C.

10. The roof sheet according to claim 9, wherein the bitumen reinforcement consists of a material having a melting point ($T_S$) in the range between 130° C. and 200° C.

11. The roof sheet according to claim 9, wherein the bitumen reinforcement consists of a material having a melting point ($T_S$) in the range between 150° C. and 190° C.

12. The roof sheet according to claim 9, wherein the bitumen reinforcement (7) consists of an organic polymer having a melt-flow index between 10 and 100 g/10 min at 230° C. and under a weight of 2.16 kg.

13. The roof sheet according to claim 9, wherein the bitumen reinforcement (7) consists of polypropylene.

14. The roof sheet according to claim 9, wherein the bitumen reinforcement (7) consists of isotactic polypropylene.

15. The roof sheet according to claim 9, wherein the bituminous covering layer (3, 5) has a softening temperature ($T_E$) between 40° C. and 150° C.

16. The roof sheet according to claim 9, wherein the bituminous covering layer (3, 5) has a softening temperature ($T_E$) between 40° C. and 130° C.

17. The roof sheet according to claim 9, wherein a styrene-butadiene-styrene content in the distillation bitumen is between 7% and 13.5%.

18. The roof sheet according to claim 9, wherein styrene-butadiene-styrene content in the distillation bitumen is below 11.5%.

19. The roof sheet according to claim 9, wherein styrene-butadiene-styrene content in the distillation bitumen is below 9.5%.

20. The roof sheet according to claim 9, wherein the bituminous covering layer is formed from a distillation bitumen which is formed with a linearly structured styrene-butadiene-styrene content.

21. The roof sheet according to claim 9, wherein the distillation bitumen is formed with linearly structured and radially structured styrene-butadiene-styrene in a ratio of more than 1:4.

22. The roof sheet of claim 21, wherein the distillation bitumen is formed only with linearly structured styrene-butadiene-styrene content.

23. The roof sheet of claim 21, wherein the distillation bitumen is formed with styrene-butadiene-styrene content in an amount which is 20% to 30% of a total elastomer amount.

* * * * *